(No Model.)
E. A. SPERRY.
AUTOMATIC GROUNDING DEVICE.
No. 400,264. Patented Mar. 26, 1889.
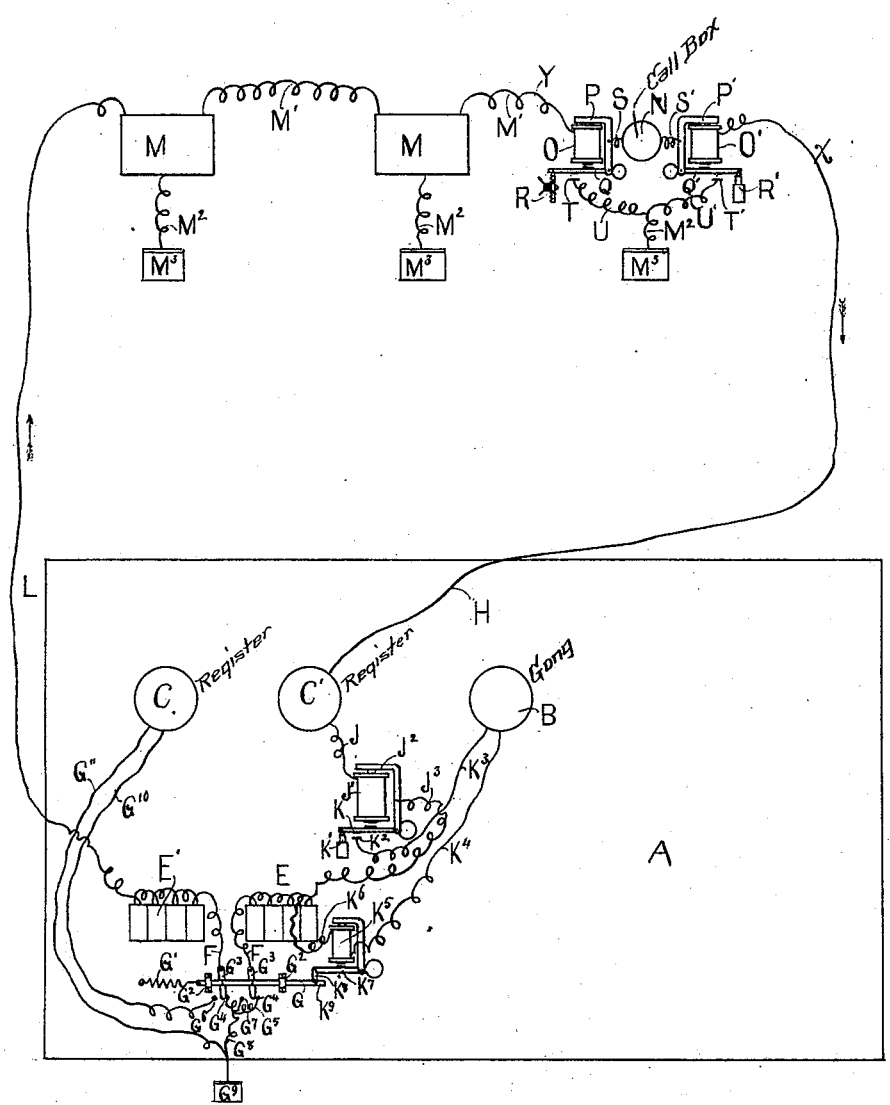
Witnesses:
Cora L. Cadwallader,
Perley Hale
Inventor:
Elmer A. Sperry
By Francis W. Parker
Atty.

UNITED STATES PATENT OFFICE.

ELMER A. SPERRY, OF CHICAGO, ILLINOIS.

AUTOMATIC GROUNDING DEVICE.

SPECIFICATION forming part of Letters Patent No. 400,264, dated March 26, 1889.

Application filed April 5, 1888. Serial No. 269,656. (No model.)

*To all whom it may concern:*

Be it known that I, ELMER A. SPERRY, a citizen of the United States, residing at Chicago, in the county of Cook and State of Illinois, have invented a certain new and useful Automatic Grounding Device for Closed Circuits, of which the following is a specification.

My invention relates to devices for grounding closed circuits, and has for its object to provide means whereby closed circuits may be grounded when broken, so as to continue the service over the same. This object I accomplish by means of the mechanism shown in the accompanying diagrammatic view.

A is supposed to represent the central station; B, a gong therein.

C C' are indicators or chemical registers.

E E' are batteries joined at the center by the wires F F and the switch. The switch is composed of the bar G, spiral spring G', guides $G^2$ $G^2$, and the switch-bars $G^3$ $G^3$, pivoted to but insulated from the bar G.

$G^4$ $G^4$ are contact-buttons, and $G^5$ a wire connecting them.

$G^6$ $G^7$ are contact-buttons. From the latter leads the wire $G^8$ to the ground $G^9$, and from the former leads the wire $G^{10}$ to the chemical register C. From this register in turn passes the conductor $G^{11}$ to the ground $G^9$. Thus the connection between the two batteries E E' is always complete when the switch-pieces $G^3$ $G^3$ rest upon the buttons $G^4$ $G^4$ or upon the buttons $G^6$ $G^7$, though in the latter case the circuit is also made to the ground and includes the chemical register C.

H is the line-conductor, which passes into the chemical register C', and J is the wire passing thence to the coil J'. The conductor is then connected with the supporting-bar $J^2$, whence passes the wire $J^3$ to the battery.

K is a pivoted armature-lever, free to move vertically beneath the core of the magnet-coil J' and provided with the retarding mechanism K'. $K^2$ is a contact-piece engaged by this pivoted lever when it descends, and from this latter passes the conductor $K^3$ to the gong B. From such gong passes the conductor $K^4$ to the magnet-coil $K^5$, from which it passes by wire $K^6$ to the wire which connects the cells of the battery, so as to make the first cell or cells develop the electro-motive force for the subsidiary circuit.

$K^7$ is a pivoted weighted lock-lever, free to move slightly beneath the magnet-coil $K^5$, and provided at its outer extremity with the pin $K^8$, adapted to engage the notch $K^9$ in the end of the bar G.

L is a line-conductor passing from the battery E' onto the line.

M is a combined call-box and line-grounding device, M' being the line-wire passing between such boxes, and $M^2$ the wire passing therefrom to the ground $M^3$.

N is a call-box contained within the mechanism M.

O O' are magnet-coils. P P' are their supported metallic frames.

Q Q' are pivoted weighted levers beneath the cores of the coils O O'. R R' are motion-retarding devices on the ends of such levers. S S' are wires passing from such call-box N to the frame-pieces P P'. These latter are connected with the wire in the coils O O'.

T T' are contact-plates in the path of the levers Q Q'. U U' are wires leading thence to the wire $M^2$ and thence to the ground $M^3$.

The gong B may be omitted without interfering with the spirit of the invention.

The use and operation of my invention are as follows: Any number of the combined call-boxes and grounding devices indicated by M M are placed in the line as desired. Then while the current is passing over the line-conductors, as indicated by the arrows, it will pass through each of these combined call-boxes and grounding devices M M, as follows: First into the spool O, thence into the frame P, thence through the wire S, box N, wire S', frame-piece P', coil O', and wire H to the central station. At the central station it will pass through the chemical register C', wire J, coil J', frame-piece $J^2$, wire $J^3$, battery E, wire F, switch-piece $G^3$, button $G^4$, wire $G^5$, button $G^4$, switch-piece $G^3$, wire F, battery E', and on to the line-wire L, thus making a complete and continuous circuit through the line, and all of the devices thereon capable of giving or registering the calls which may be turned in from the boxes on the line by means of the chemical register C'. The calls as they are turned in break the current, but this is for a very brief space of time and not sufficient to permit the levers Q, Q', and K to descend from the energized cores of the magnet-coils.

If, now, the line be cut or broken at the point X, so that the current is necessarily discontinued for a considerable portion of time, the levers Q, Q', and K will descend upon their respective contact-plates, and the course of the current will be as follows: Commencing with battery E', passing through line L, sundry combinations M M, and line-wire M' M' into the spool O, which it energizes, restoring the lever Q to its original position, thence through the frame P, wire S, call-box N, wire S', frame-piece P', lever Q', contact-plate T', line U', wire $M^2$, into the ground $M^3$, thence through the ground to the ground $G^9$, along wire $G^{11}$, through chemical register C, along wire $G^{10}$, button $G^6$, switch-piece $G^3$, wire F, and thence into the battery E', as hereinafter explained. The interruption of the current, as above referred to, causes all the levers to descend. The lever K descending upon its contact-plate $K^2$ establishes a current through the wire $K^3$, mechanical gong B, wire $K^4$, magnet-coil $K^5$, wire $K^6$, to the battery E. By this means the coil $K^5$ is energized, the lever $K^7$ is drawn upward and the bar G released, so that the spring G' will draw it to one side to move the switch-pieces $G^3$ $G^3$ onto the buttons $G^6$ $G^7$. As soon as the automatic grounding takes place a circuit is established between the ground which is between the central station and the point X and the ground, which circuit includes the magnet J' and battery E and chemical register C'. In this manner the circuit is, as it were, divided into two parts, and each is operated. In each house or place to be protected is placed one of the combined boxes and grounding devices M, consisting, substantially, of the devices shown, the box N placed between two ground devices, so that if the line be cut upon either side of such box the operation just described will take place and the mechanical gong will be started ringing in the station, thus awakening or calling the attention of the operator. Immediately thereafter the two circuits are established from the two grounds $M^3$ $M^3$, adjacent to each other, to the ground $G^9$, one of such circuits including the battery E' and the other the battery E. The motion-retarding devices K', R, and R' are so timed and adjusted as to retard the motion of the pivoted armature or pivoted lever, in the event of any short or temporary interruption of the current, and thus prevent the lever from reaching the ground contact-piece. When the line is broken for a considerable period of time, these levers, as above described, will all drop to their contact-pieces, and the current, when sent through, will restore them all to their position, except in the case of this lever controlled by the magnets between which the break has been made, and through these two the ground-connections are established. If the current has been withdrawn from the line, as during the course of the day, all these levers will fall to their contact-pieces, but as soon as the current is turned on at night they will all be restored to their positions unless the line has been broken, and in that event the operation will be the same as above described, and the gong will cause the alarm to be rung, thus showing that the line has been cut at some point. The entire circuit is virtually divided into two separate circuits after the line has been broken. The local circuit through the gong B is only operated for a very brief period of time, as the newly-established currents immediately energize the magnet J' and take the gong out of circuit. Therefore a mechanical gong must be used which will continue to ring until the operator stops it.

Having thus described my invention, what I claim, and desire to secure by Letters Patent, is as follows:

1. The combination of a main normally-closed metallic circuit with an electro-magnet therein, a ground circuit and contact, a pivoted armature-lever adapted to move between such contact and such magnet, such armature held to such magnet by the influence of the current passing over the main line, and a motion-retarding device connected with such armature-lever, which permits the same to leave the magnet and engage the contact only when the current is discontinued for a considerable period of time.

2. The combination of a main normally-closed metallic circuit with an electro-magnet therein, a ground circuit and contact, a pivoted armature-lever adapted to move between such contact and such magnet, such armature held to such magnet by the influence of the current passing over the main line, and a retarding device connected with such armature-lever, which permits the same to leave the magnet and engage the contact only when the circuit is discontinued for a considerable period of time.

3. The combination of a main normally-closed metallic circuit with a call-box therein, an electro-magnet on each side of said call-box in the main circuit, a pivoted armature-lever controlled by each of said magnets, a ground-line and two contacts, one in the path of each of such levers, said levers attracted to the magnets by the influence of the current passing over the main line, and two motion-retarding devices connected with such armature-levers, which permit the same to leave the magnets and engage the contacts only when the current is discontinued for a considerable period of time.

4. The combination of a main normally-closed metallic circuit with an electro-magnet therein, a local circuit and a contact, a pivoted armature-lever adapted to move between such contact and such magnet, such armature held to such magnet, said local circuit containing an electro-magnet, in combination with a grounding-switch controlled by said magnet and connected with the battery, so as to ground the same when the main line is broken.

5. The combination of a main normally-closed metallic circuit with an electro-magnet therein, a local circuit and a contact, a pivoted armature-lever adapted to move between such contact and such magnet, such armature held to such magnet, said local circuit containing an electro-magnet, in combination with a grounding-switch controlled by said magnet and connected with the batteries, so as to ground the same when the main line is broken, and a second electro-magnet in the main line, with a pivoted armature-lever, and a ground-line and a contact-point in the path of said armature-lever.

6. The combination of a normally-closed metallic circuit with an electro-magnet therein, a pivoted armature-lever controlled by said magnet, a ground-line and a contact-point in the path of such lever, a second electro-magnet in the main line, a pivoted armature-lever controlled thereby, a local circuit with contact-point in the path of said lever, an electro-magnet in such local circuit, a battery in the main circuit, a ground-line, and a switch controlled by said last-mentioned magnet and adapted to ground the battery, so that when the main line is broken it is grounded at the battery and on the line, so as to make a circuit, part ground and part metallic circuit.

7. The combination of a normally-closed metallic circuit with an electro-magnet therein, a pivoted armature-lever controlled by said magnet, a ground-line and a contact-point in the path of such lever, a second electro-magnet in the main line, a pivoted armature-lever controlled thereby, a local circuit containing an alarm, with contact-point in the path of said lever, an electro-magnet in such local circuit, a battery in the main circuit, a ground-line, and a switch controlled by said last-mentioned magnet and adapted to ground the battery, so that when the main line is broken it is grounded at the battery and on the line, so as to make a circuit, part ground and part metallic circuit.

8. The combination of a normally-closed metallic circuit with a series of call-boxes therein, an electro-magnet on each side of each box, a pivoted armature-lever attracted to such magnet by the influence of the current passing therethrough, a ground-line and contact-point in the path of each of such levers, a central-station magnet in such main line with similar armature-lever, a local circuit having a contact-point in the path of such lever and containing an electro-magnet, a ground-line contact-point, battery, and battery-grounding switch, the latter controlled by the electro-magnet in the local circuit.

9. The combination of a normally-closed metallic circuit with a series of call-boxes therein, an electro-magnet on each side of each box, a pivoted armature-lever attracted to such magnet by the influence of the current passing therethrough, a ground-line and contact-point in the path of each of such levers, a central-station magnet in such main line with similar armature-lever, a local circuit containing an alarm and having a contact-point in the path of such lever and containing an electro-magnet, a ground-line contact-point, a battery, and battery-grounding switch, the latter controlled by the electro-magnet in the local circuit.

ELMER A. SPERRY.

Witnesses:
CORA L. CADWALLADER,
MARIAN D. THATCHER.